United States Patent [19]

Corominas

[11] Patent Number: 4,620,478
[45] Date of Patent: Nov. 4, 1986

[54] FILTRATION APPARATUS FOR USE WITH A MEAT-PIECE FLUID INJECTOR

[75] Inventor: Narciso L. Corominas, Gerona, Spain

[73] Assignee: Metalquimia S.A., Gerona, Spain

[21] Appl. No.: 690,592

[22] Filed: Jan. 11, 1985

[30] Foreign Application Priority Data

Oct. 24, 1984 [ES] Spain ................................. 537043

[51] Int. Cl.$^4$ ........................... A23B 4/02; A23L 3/34
[52] U.S. Cl. .................................... 99/533; 99/535; 210/330
[58] Field of Search ............... 99/532, 533, 534, 535, 99/494, 408; 210/330, 333.1, 404, 393

[56] References Cited

U.S. PATENT DOCUMENTS

| | | | |
|---|---|---|---|
| 1,878,998 | 9/1932 | Akins | 210/330 |
| 3,221,887 | 12/1965 | Schade | 210/330 |
| 3,590,721 | 7/1971 | Hoffmann | 99/533 |
| 4,283,285 | 8/1981 | Paschen et al. | 210/330 X |
| 4,391,706 | 7/1983 | Steinkraus | 210/330 X |

*Primary Examiner*—Timothy F. Simone
*Attorney, Agent, or Firm*—Holman & Stern

[57] ABSTRACT

A number n of equal receptacles, the bottom of which is a filtering screen, arranged adjacent to each other making up a circular structure which is rotated through an intermittent travel of 1/n of a full turn, with respect to a horizontal shaft in the center of the structure, in such a way that sequentially and at regular intervals, two of these receptacles, one of them positioned at the top with its mouth upwards and its bottom horizontal and the other inverted in the lower position, are at the same time faced with an unfiltered brine effluent delivered through a nozzle (the upper one) and a pressurized cleaning fluid swept against its bottom external side (the lower). A double acting hydraulic piston, linked to a forked lever and a double pawl device, actuates rotatively in its quick advance stroke the above-mentioned horizontal hollow shaft which houses the cleaning-fluid pipe and which is connected to the circular structure of receptacles, and actuates by its slow retreat stroke the pressurized pipe fitted with a plurality of nozzles for the cleaning fluid.

6 Claims, 8 Drawing Figures

Fig. 8

FILTRATION APPARATUS FOR USE WITH A MEAT-PIECE FLUID INJECTOR

BACKGROUND OF THE INVENTION

The invention concerns fluid filtration equipment, specially designed to be attached to injecting machines for meat pieces with a substance to be injected such as brine, proteins, phosphates or other products appropriately dissolved, to help in the preservation and/or improvement of the taste and contexture of the treated meat piece.

In conventional filtration systems, a number of filters, which are normally placed in the bottom of a receptacle superposed to the main supply reservoir of the substance to be injected, are periodically replaced by clean filters while they are thoroughly cleaned and replaced again, this task being performed by the operator in charge of the machine.

In the application for a Spanish Pat. No. 532.268, owned by the applicant, a filtration system is described which includes two receptacles with a filtering bottom, arranged in and adjacent a pouring duct for substance to be re-cycled which may be manually moved at will, placing its end on the one or on the other of those receptacles and thereby allowing continuous operation since it is possible to clean one of the receptacles' filtering bottom while the other is filtering the substance to be recovered.

In any way, the need and the importance of finding a filtering system can be well understood in which the filter cleaning can be automatically performed, keeping always a portion of filtering surface under the delivery nozzle of that substance.

Although, in principle, it would seem ideal to solve this problem with rotative filters, well known and used in other industries and which often include some peripheral scraping plates and air blast cleaning, this type of filter system has been shown to be ineffective for filtering substances like the ones injected into meat pieces due to the presence of proteins and sugars in thoses substances. (These cause the surface tension of the brine or the liquid to be recovered to decrease down to values which tend to make a film all over the receptacle's internal wall, clogging the filtering mesh and rendering it useless for its specific function, and also making difficult the cleaning operation.)

In order to provide an appropriate solution to these problems, what I propose now is a filtering apparatus basically characterized by a number of equal receptacles, the bottoms of which are provided in their full areas with a filtering screen having a mesh suitable to prevent the clogging of the injecting needles.

SUMMARY OF THE INVENTION

The proposed filtering equipment is integrated into the recovery circuit of the injection substance, which is pumped through a pipe towards a supply reservoir for such substance, and is used to remove from such injection substance the greases, impurities or other materials not inherent to the initial substance that may be introduced in it during the meat injection process. The equipment is basically characterized by an ensemble which incorporates a series of independent filters which are sequentially placed under the end of the effluent nozzle of the injection machine until the moment in which the filtering mesh begins to be occluded. At that time, the filter receptacle is automatically rotated from its position to that which was occupied by another filter. Simultaneously with this described process, another filter from the ensemble is subjected to a cleaning phase so that the working conditions of each filter are optimized.

To clean the filter, it must be rotated to an inverted position, whereafter cleaning fluid pressure flow is directed against the external side of its filtering screen bottom, or optionally an air pressure blast. In this way in the first of these receptacles, the material to be filtered is uniformly spread all over the horizontal bottom, being thus subjected during this phase to gravity. Very efficient cleaning results since very little liquid remains in the mentioned filtering cloth (mesh); this reduces the dilution of the recovered substance during its filtering, by decreasing the percentage of water (the cleaning fluid) in the product solution to be injected. The duration of these operations is adjustable to a value such that it allows an optimal cleaning of the second receptacle and also that the clogging of the filtering mesh in the first one cannot be reached.

BRIEF DESCRIPTION OF THE DRAWINGS

To afford a better understanding of the features of the filtering equipment to which this patent relates, some drawings are included in this specification on which a preferred, not limitative, embodiment of this invention has been drawn, according to the following detailed account.

Finally, in FIGS. 7 and 8, details are given regarding the several receptacles and of their filtering bottoms.

DETAILED DESCRIPTION OF THE DRAWINGS

According to these figures, a preferred embodiment includes an even number of receptacles 10, the rectangular bottoms of which are filtering screens 11, and their configuration that of an open inverted frustum. These receptacles make up an ensemble of annular configuration, the internal section of which is a right octagon.

The receptacle 10 ensemble is attached at one of its external sides to an annular plate 12 (see FIG. 3), which in turn is joined by means of a series of radial arms 14 to a horizontal shaft 15, which passes through the center of the annular structures, and around which the whole ensemble rotates with an adjustable speed and in angular limits of travel equal to 1/n of a full turn, where n is the number of receptacles 10 that constitutes the ensemble. Stopping intervals may also be pre-set to various values.

Figure 1:
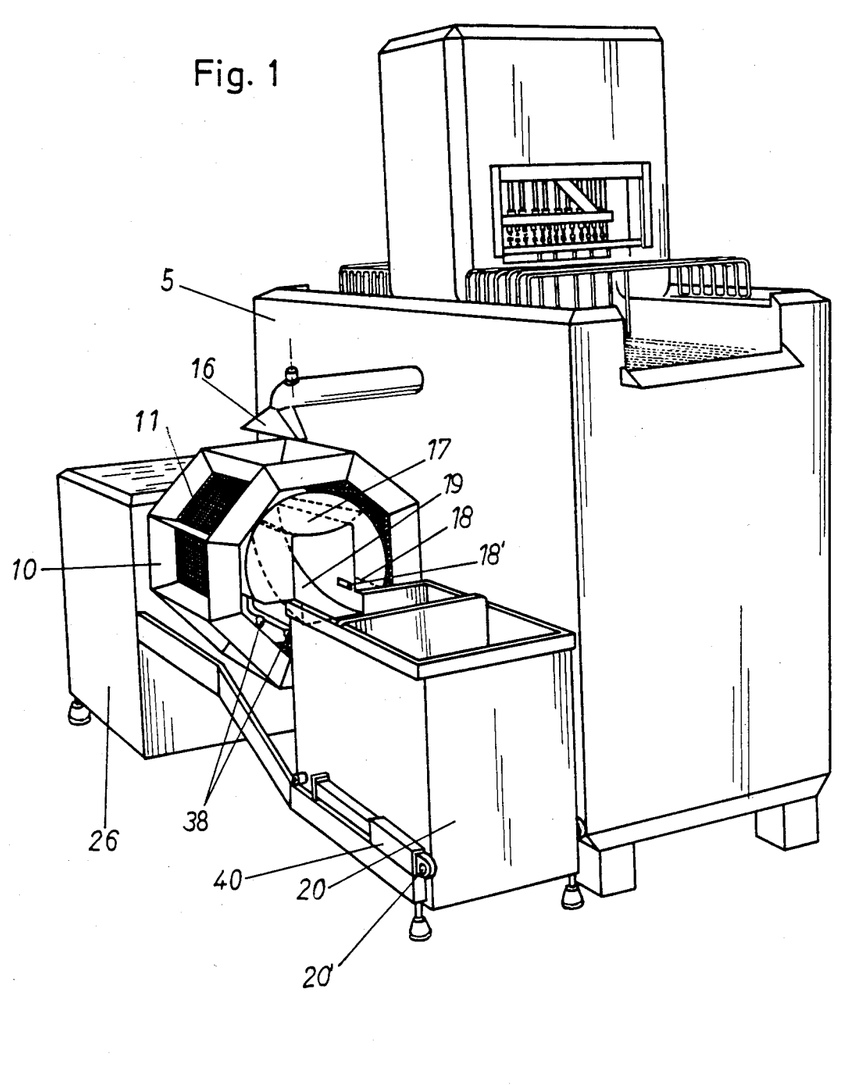
FIG. 1 shows in perspective the filtering equipment ensemble attached to an injecting machine for meat pieces of a known type, such as the ones covered by the Spanish patent application Nos. 532.268 and 532.269, owned by the applicant.
Figure 2:
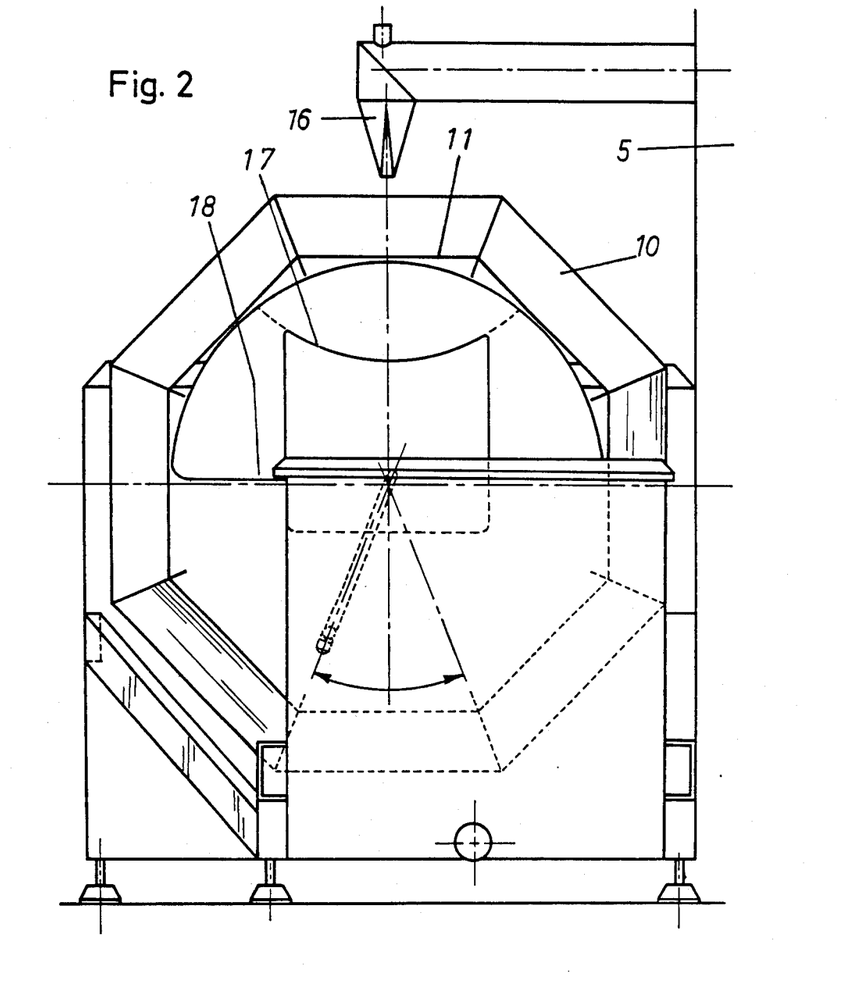
FIG. 2 is a side view of the ensemble of receptacles for the filter, organized in closed-circuit shape like a regular octagon.
Figure 3:
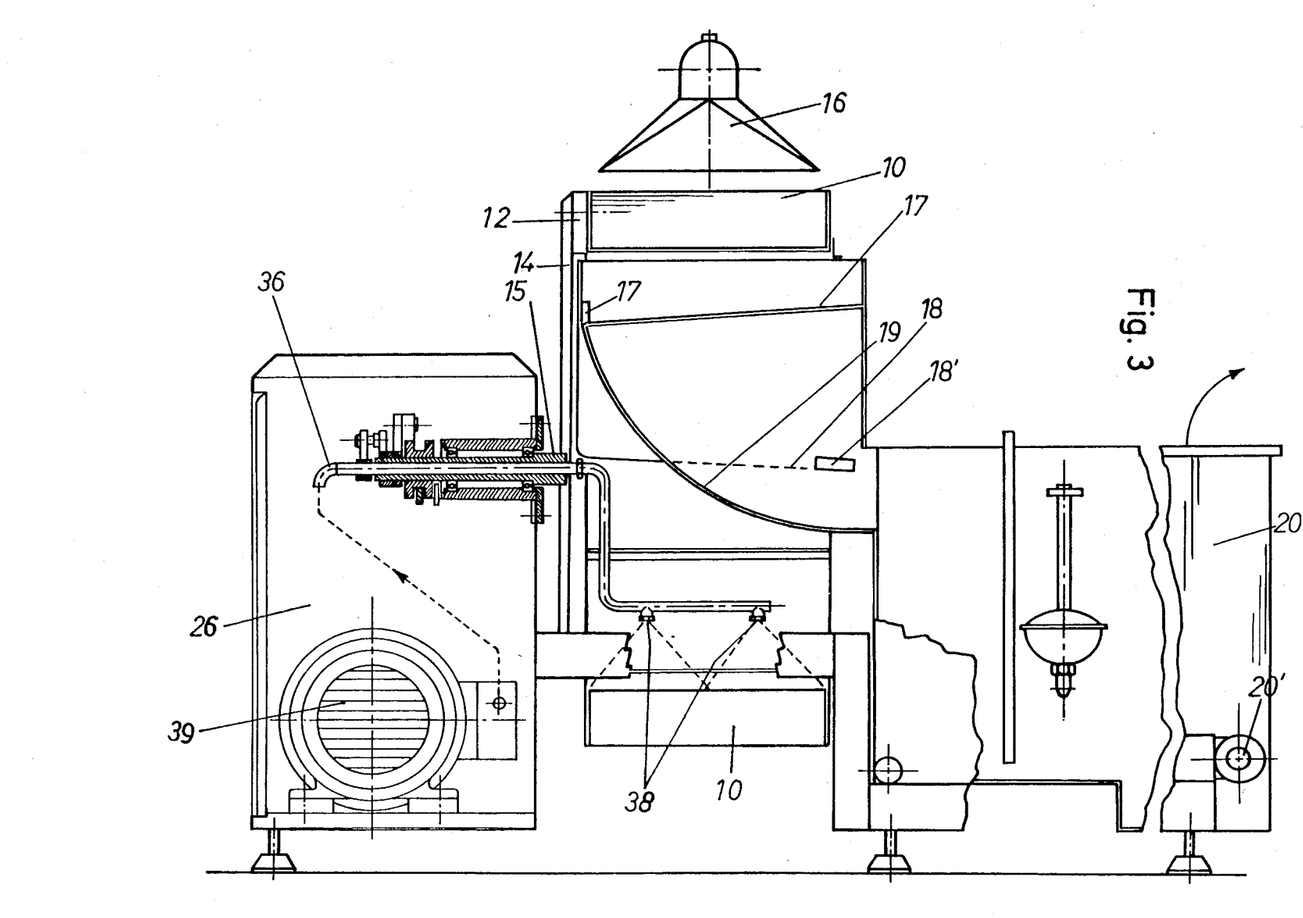
FIG. 3 illustrates a cross-sectional view of the equipment ensemble, showing its driving elements, the substance collection trays, and the main reservoir for the injection substance into which these trays empty.

It can be seen in FIGS. 2 and 3 that one of the receptacles 10 is prositioned with its mouth upwards; it is being loaded with the substance to be re-cycled from a nozzle 16 which tends to spread it on the whole bottom 11, while the directly opposite receptacle 10 remains in an inverted position and is subjected to cleaning with a pressurized jet of water coming from the main machine cooling circuit 5 or from an independent circuit. Inside the annular structure of this embodiment, there are fixed trays 17 and 18 which provide for the collection and circulation of the filtered substances. One of these trays 17 is positioned just under the upper receptacle 10 being loaded with the substance to be re-cycled, thus catching most of the filtered substance, while the other ones 18 are arranged below and along the sides of the first one, and are aimed to collect the foreseeable drippings from the receptacles 10 during their travel phase of one or more 1/n turn from their upper active positions. These two trays 18 communicate through the three drains 17' and 18' with a sloped panel 19 which is placed above the main reservoir 20 of the substance to be injected. The trays 17 and 18 and panel 19 are thus fixed to the reservoir 20, which, as a unit, can be slid along a pair of rails 40 to permit the removal of said trays or the servicing of said reservoir. (The reservoir may be emptied by pivoting it on the hinges 20'.)

Figure 7:
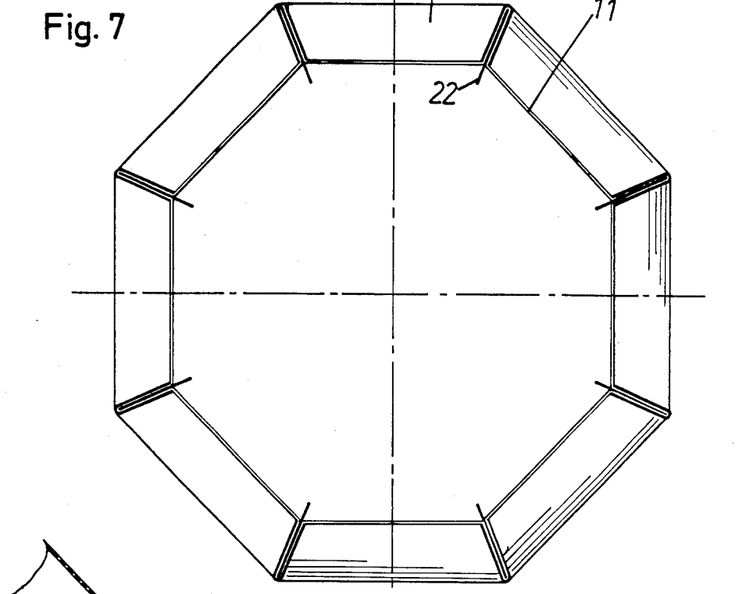
Figure 8:
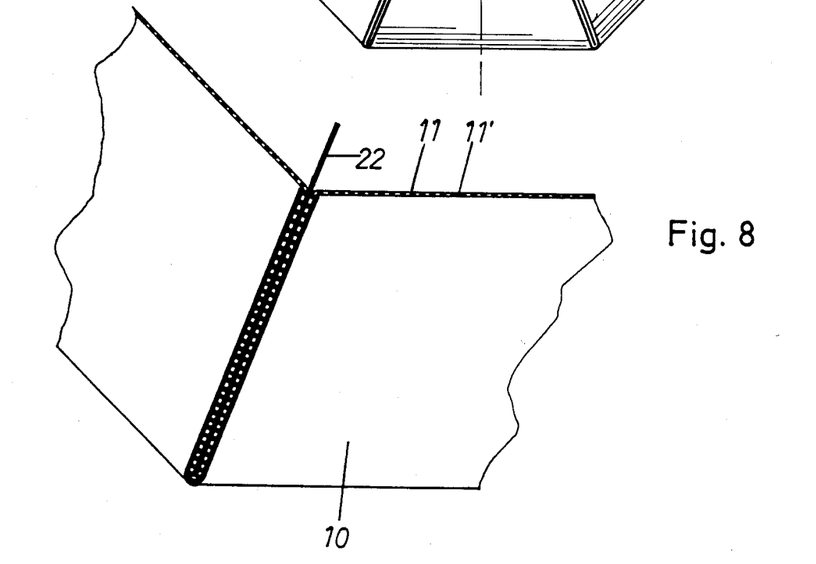

As can be seen in FIGS. 7 and 8, the side walls of the receptacles 10 are slightly extended in their lower portion towards the inside, in an orientation mutually converging, forming the walls 22 to stop the possible flow of brine or other substance or liquid along the whole internal polygonal profile of the ensemble, forcing it either to be discharged or to drip directly on the horizontal collection trays 17 and 18. It can also be seen in FIG. 8 how the bottoms of the receptacles 10 are fully formed of a filtering mesh 11' which extends totally covering even the side walls of these receptacles 10, and which themselves are covered in the junctions by the walls 22.

Figure 4:
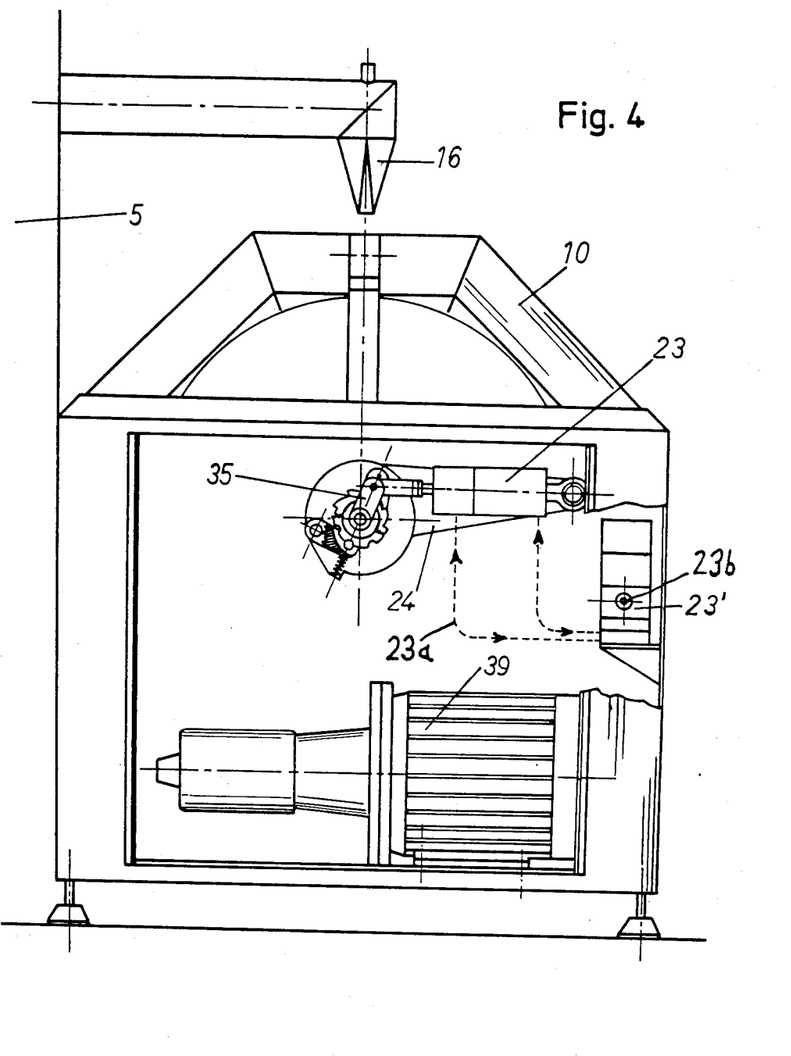
In FIG. 4, the means for rotating the filtering bottom receptacle ensemble are shown in a side view.
Figure 5:
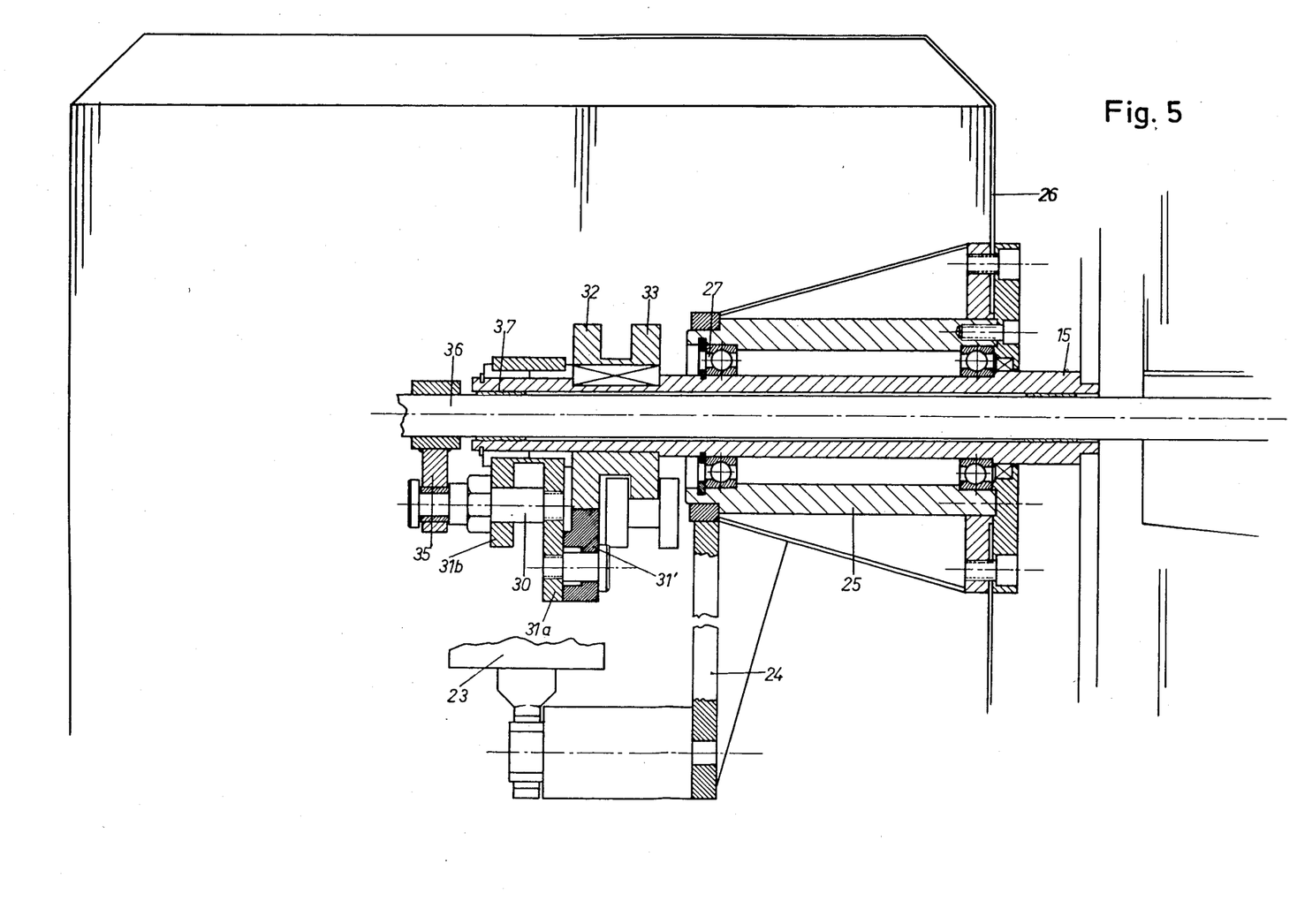
FIG. 5 is a cross-sectional view of FIG. 3, at a greater scale, showing the means connected to the turning shaft to provide a pre-set angular travel to the receptacle ensemble and, simultaneously, to a pipe for cleaning liquid pressure deliver.

As indicated by various views in FIGS. 3, 4, and 5, the central shaft 15, to which the receptacles 10 are linked, is driven by means of a separate linear hydraulic motor made up of an adjustable flow-reversing pump 23', equipped with two flow monitor-controllers (not shown), and a double-acting piston 23 installed on a radial support 24 which is linked to a cylinder 25 which if fixed on the frame 26, coaxial with the shaft 15, with the ball bearing 27 between them. The reversing pump 23' may be supplied from a common hydraulic source along with the water pump 39 and the main injecting machine; it is provided with a dial adjustor 23b which is used to vary the two monitor-controllers whose reversible flow to/from the piston 23 through lines 23a determines the speed of said piston in one or both directions.

Figure 6:
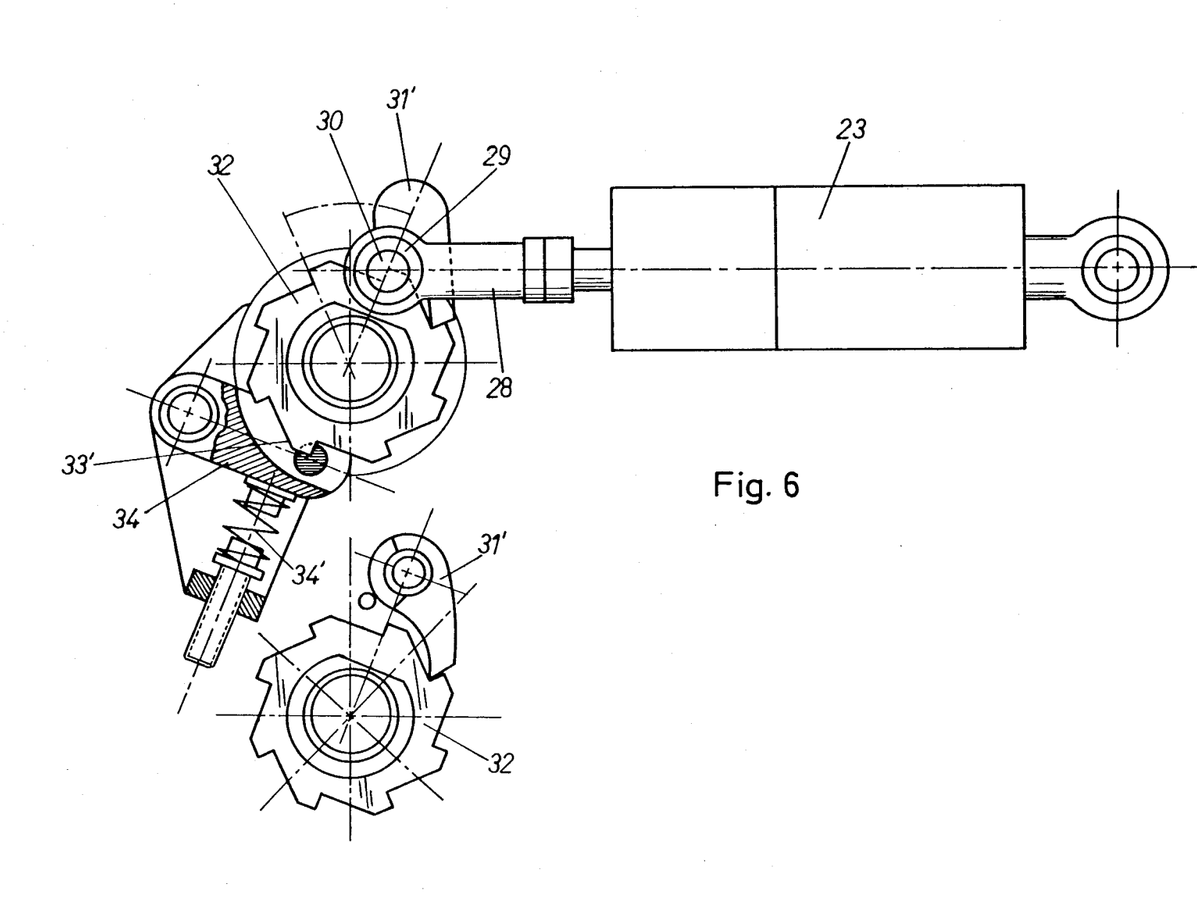
FIG. 6 illustrates the drive means for turning the receptacle ensemble in a pre-set angular travel already illustrated in FIG. 4, but at a larger scale.

Briefly with reference to FIGS. 5 and 6, the stem 28 of the piston 23 is coupled to a knee-joint 29 fitted to the neck 30 of a fork-shaped lever 31 which tangentially actuates a pawl wheel, or sprocket, 32 which is secured coaxially to the shaft 15. This pawl wheel 32 contains a second crown (sprocket) 33 having a series of peripheral notches 33' where a positioning element 34, loaded by a spring 34', may rest in order to ensure the shaft's 15 immobility during the piston's 23 retreat phase, which is slow and of an adjustable duration. The nail claw 31' travels on the wheel 32 which is maintained in a fixed position by the positioning device 34. The advance travel of the piston 23 is quick, and there is an intermittent angular movement of ⅛ of a full turn of the shaft 15 by virtue of the the eight teeth of the pawl wheel 32 and consequently the same angular travel characterizes the receptacles 10.

On the other side of the wheel 32 as rendered in FIGS. 4 and 5, the second crank arm (shorter) of the fork 31b is connected to the end of the stem 28 of the piston 23 and further connected to a parallel lever 35, which in turn is perpendicularly secured to the pipe 36. This pipe 36 is coaxially inserted into the hollow of the horizontal shaft 15, with the bearings 37 allowing its independent rotation with respect to the shaft 15.

FIGS. 3 and 4 show that one or two downward-directed nozzles 38 terminate pipe 36 outside the hydraulic motor frame 26, and through these water, or optionally air from an independent source, is projected under pressure by means of a water pump 39, for the receptacles' 10 cleaning phase. Thus, while the upper receptacle 10 is being loaded with the substance to be re-cycled, in a steady position during the hydraulic piston's 23 slow retreat phase, there is also a slow rotation of the pipe 36. Consequently, a sluggish oscillation of the watering nozzle 38 takes place fully sweeping the bottom of the inverted lower receptacle 10, thoroughly cleaning the whole surface of its filtering mesh 11.

While a preferred embodiment has been shown and described, it will be understood that the present invention is not limited thereto, but may be otherwise embodied within the scope of the following claims.

I claim:
1. Fluid filtration apparatus, for use in conjunction with the reservoir of a fluid-injecting machine for meat pieces, comprising:
   a pressurized water source;
   a plurality of mesh-bottomed filter receptacles assembled in a vertical circular ensemble having an innermost direction, an outermost direction, and uppermost direction, and a lowermost direction; whereby the mesh bottoms are disposed in said innermost direction; an outflow port in communication with the fluid-injecting machine;
   an upper exhaust-fluid nozzle fixedly mounted above an uppermost one of said plurality of filter receptacles and connected to said outflow port of the fluid-injecting machine so that unfiltered fluid may be dumped into said uppermost one of said plurality of receptacles,
   a set of trays disposed in a direction below said uppermost one of said plurality of filter receptacles and within said circular ensemble so as to capture filtered fluid emanating from said uppermost one of said plurality of receptacles; a rotatably mounted pipe disposed within said circular ensemble;
   a fluid delivery means communicating between said set of trays and the reservoir of the fluid-injecting machine,
   a lowermost one of said plurality of filter trays being in an inverted position;
   a plurality of lower nozzles mounted on said rotatably mounted pipe within said circular ensemble, and in a direction below said set of trays, and in a direction above said lowermost one of said plural- ity of filter receptacles, and connected to said pressurized water source, and a drive means including a linear hydraulic motor, arranged to rotate said circular ensemble at one speed while simultaneously rotating said rotatably mounted pipe and said plurality of lower nozzles at a different speed and on a regularized intermittent basis so as to cause effluent from said upper exhaust-fluid nozzle to run substantially completely over the mesh bottom of said uppermost one of said plurality of filter receptacles while pressurized water from said plurality of lower nozzles sweeps over the mesh bottom of said lowermost one of said plurality of filter receptacles.

2. The fluid filtration apparatus of claim 1 wherein there are an even number, n, of filter receptacles, each having a box-like shape of a quadrilateral-based frustum and wherein said drive means stops the rotation of said circular ensemble and starts the rotation of said rotatably mounted pipe for an adjustably variable interval after every 1/n turn of said circular ensemble.

3. The fluid filtration apparatus of claim 2 wherein each one of said plurality of filter receptacles has a pair of side walls, said side walls being slightly extended at a location at the bottom toward a center region of said circular ensemble so that by mutual converging of said side walls, stray fluid drippings may be continually directed to said set of trays.

4. The fluid filtration apparatus of claim 1 wherein said drive means includes a double-acting hydraulic piston which is connected to an adjustable flow-reversing pump, said pump being equipped with at least one flow monitor-controller to set the speed of said piston in at least one direction of travel; a dual sprocket escape mechanism; and wherein said piston is attached to said dual-sprocket escape mechanism; a first one of the sprockets being attached to said circular ensemble and the second one of the sprockets being attached to said rotatably mounted pipes, whereby actuation of said piston rotates the first one of the sprockets rapidly and retraction of said piston rotates the second one of the sprockets slowly.

5. The fluid filtration apparatus of claim 1 wherein said upper tray has two longest sides; a sloped drain panel; a pair of rails; said set of trays including one upper tray and a drain slot mounted directly beneath said uppermost one of said plurality of filter receptacles; and two lower side trays and a plurality of drain slots being disposed along said two longest sides of said upper tray to catch stray fluid drippings from ones of said plurality of filter receptacles on either side of said one upper tray, whereby said set of trays is connected to said fluid reservoir over said sloped drain panel, and wherein said set of trays and said reservoir can be removed from said circular ensemble by sliding along said pair or rails.

6. The fluid filtration apparatus of claim 1 wherein compressed air is used in lieu of pressurized water as a cleaning agent for said lowermost one of said plurality of filter receptacles.

* * * * *